March 11, 1969 R. M. NOWAK ET AL 3,431,597
APPARATUS FOR DISPENSING VISCOUS MATERIALS INTO MOLDS
Filed Feb. 7, 1966

INVENTORS.
Robert M. Nowak
William K. Glesner
BY Robert B. Ingraham
AGENT

United States Patent Office 3,431,597
Patented Mar. 11, 1969

3,431,597
APPARATUS FOR DISPENSING VISCOUS MATERIALS INTO MOLDS
Robert M. Nowak and William K. Glesner, Midland, Mich., assignors to The Dow Chemical Company, Midland, Mich., a corporation of Delaware
Filed Feb. 7, 1966, Ser. No. 525,640
U.S. Cl. 18—5                                              7 Claims
Int. Cl. B29b 5/04; B67d 3/00

ABSTRACT OF THE DISCLOSURE

A dispensing apparatus of the non-drip variety for dispensing predetermined quantities of a viscous resin employs a nozzle having a number of discharge openings which have a total cross-sectional area of at least 75 percent of the inlet area of the nozzle.

---

Figure 1:
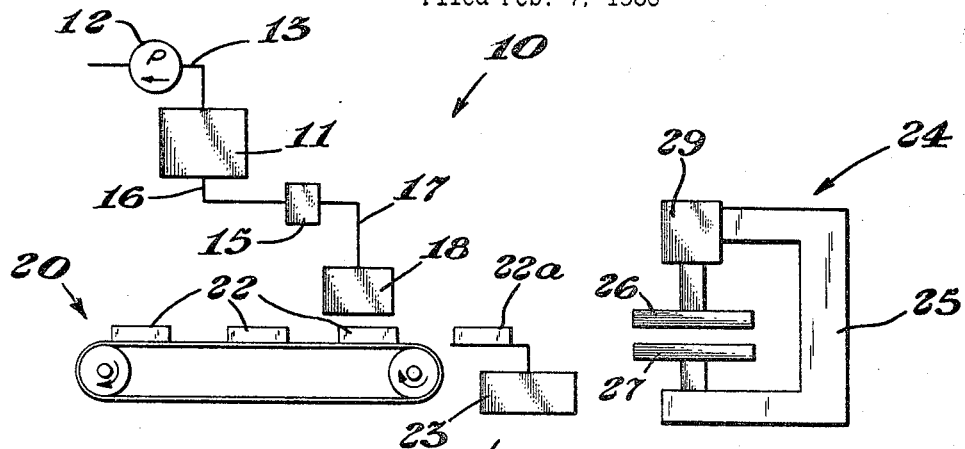

This invention relates to an apparatus for the dispensing of viscous materials and more particularly relates to an apparatus for the dispensing of viscous polymerizable materials containing particulate fillers.

Oftentimes it is desirable to dispense viscous polymerizable materials containing particulate fillers in predetermined quantities over a support or substrate. For example, in the matched die molding of a polymerizable material such as a chlorostyrene composition containing a particulate filler such as clay, the mixtures oftentimes have viscosities which range from about 4000 to 100,000 centipoises and it is desired to distribute such mixtures on a reinforcing mat such as a glass fiber mat in such a manner that relatively uniform coverage is obtained. It is beneficial that uniform coverage of such a reinforcing mat be achieved in order to prevent dislocation or movement of the reinforcing fibers when the impregnated or coated preform is placed between matched dies, compressed and heated to form a curved product. A critical problem is the dispensing of the viscous hardenable materials in such a manner that the required distribution is obtained and that the dispensing orifice or means does not drip and deposit the polymerizable material in undesired locations. It is also desirable that such a dispensing mechanism or device be capable of uniformly depositing a coating of polymerizable material on a reinforcing mat which may be up to several feet in width. The success of automated or similarly mechanized molding may depend upon a dispensing device which is capable of uniform application and uniform shutoff with non-drip characteristics.

It is an object of this invention to provide an improved apparatus for the dispensing of viscous materials.

A further object of this invention is to provide an improved nozzle for the dispensing of viscous liquids containing a particulate filler.

These benefits and other advantages in accordance with the method employed with the apparatus of the present invention comprise continually dispensing a viscous material containing a particulate filler, the viscous material having a viscosity of from about 4000 to about 100,000 centipoises, the method comprising forwarding a predetermined volume of the viscous material through a conduit into a dispensing configuration, discharging the viscous material from the dispensing configuration at a location remote from the point of entry of the viscous material through a plurality of openings defined by the dispensing configuration, the openings having an area of at least 75 percent the cross-sectional area of the conduit supplying the dispensing configuration, the dispensing configuration having openings which are sufficiently small to prevent discharge of material therefrom by gravity.

Also contemplated within the scope of the present invention is a dispensing nozzle particularly suited and adapted for the dispensing of viscous liquids containing particulate filler materials, the liquid particulate material mixture having a viscosity from about 4000 to about 100,000 centipoises, the nozzle comprising a housing, the housing having a generally elongate configuration and having a first edge and a second edge, the first and second edges being generally opposed, the housing defining an internal cavity, an inlet passageway having a cross-sectional area A in a plane normal to the direction of flow, the inlet passageway being disposed on the first edge of the housing and the second or lower edge of the housing defining a plurality of discharge openings in generally parallel relationship.

Figure 4:
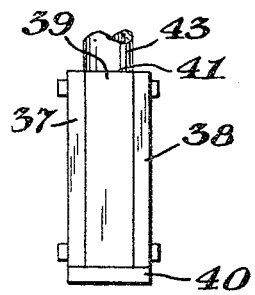
Figure 2:
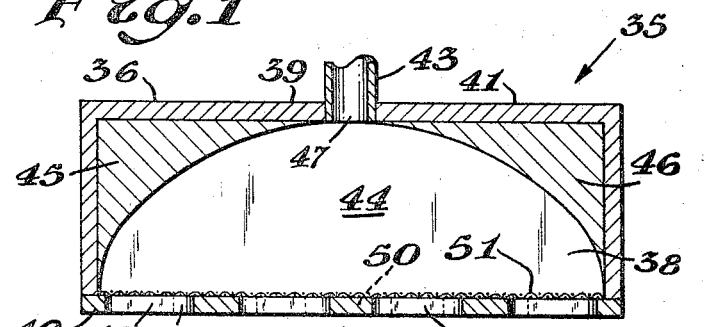
Figure 7:
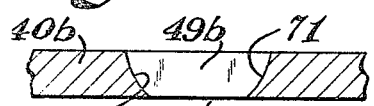
Figure 3:
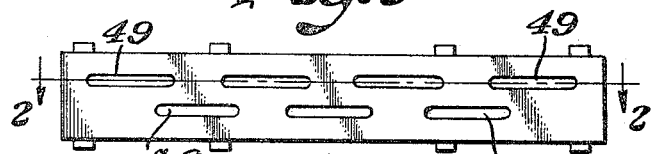
Figure 8:
Figure 5:
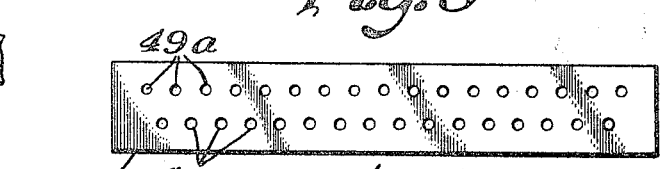
Figure 6:
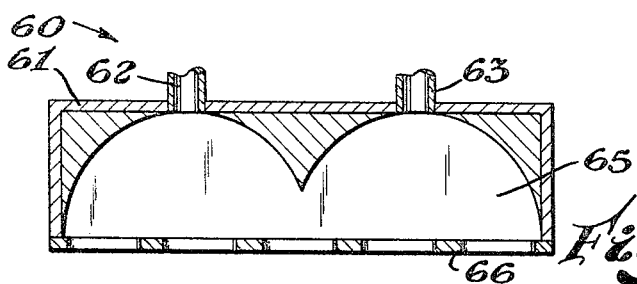

Further features and advantages of the present invention will become more apparent from the following specification when taken in connection with the drawing wherein:

FIGURE 1 is a schematic representation of an apparatus for the practice of the present invention;
FIGURES 2, 3 and 5 show three views of a dispensing nozzle in accordance with the present invention;
FIGURE 4 is an end view of a dispensing nozzle in accordance with the present invention;
FIGURE 6 is a schematic sectional representation depicting an alternate arrangement of an internal cavity within the nozzle of the invention; and
FIGURES 7 and 8 depict alternate shapes of openings usable with the nozzle of the invention.

In FIGURE 1 there is schematically depicted an apparatus in accordance with the present invention generally designated by the reference numeral 10. The apparatus 10 comprises in cooperative combination the liquid supply means 11 having in operative association therewith an evacuating pump 12. The evacuating pump 12 is connected to the liquid supply means 11 by a conduit 13. A positive displacement metering pump 15 is in communication with the liquid supply means 11 by means of the conduit 16. The constant displacement metering unit 15 is adapted to deliver intermittently predetermined quantities of liquid to a discharge line 17 which is in operative communication with a dispensing nozzle 18. A conveyor 20 is disposed adjacent the nozzle 18. The conveyor 20 travels in the direction indicated by the arrows and has disposed thereon a plurality of preforms or mats 22 adapted to receive liquid from the dispensing nozzle 18. A transfer means 23 is disposed generally adjacent the dispensing means 18 and the conveyor 20 and adapted to convey a wetted or coated preform 22a to a matched die molding press 24. The press 24 comprises a frame 25, a first platen 26, a second platen 27, means 29 to move the platens relative to one another.

In operation of the apparatus of FIGURE 1 a liquid dispersion of a viscous hardenable material such as a liquid resin or polymerizable composition admixed with a particulate filler such as clay, short fibers or the like is disposed within the liquid supply means 11. The pump 12 reduces the pressure within supply means 11 and removes a major portion of gas entrapped within the liquid mixture. A positive displacement pump or forwarding means 15 receives on demand a predetermined quantity of the viscous liquid material from the supply means 11 through the conduit 16, subsequently discharging it through the line 17 in the discharge dispensing nozzle 18 to spread it evenly upon the surface of the preform or mat 22 carried by the conveyor 20. The coated or impregnated preform 22a is then positioned on the second platen 27 of the press 24. The press 24 then closes and molds an article of desired shape from the preform. As the resin is uniformly and evenly distributed on the surface of the preform 22 no tendency is observed for significant flow of the reinforcing material during the molding operation. For the sake of clarity, interlocking timing and control mechanisms and devices are not shown.

In FIGURES 2, 3 and 5 are shown three views of a dispensing nozzle or means generally designated by the reference numeral 35. The nozzle 35 comprises a housing or body 36. In FIGURE 4 it is seen that the housing 36 comprises four major portions, a first side 37, a second side 38, a center section 39, and a lower edge 40. An upper edge 41 is remotely disposed from the lower edge 40. An inlet passageway or conduit 43 enters the upper edge 41 and communicates with a cavity 44 defined by the sides 37, 38, the center section 39 and the lower edge 40. Disposed within the cavity 44 is a first flow deflector 45 and a second flow deflector 46 which taper outwardly from a discharge end 47 of the conduit 43. A plurality of slots 49 are defined within the lower edge 40. A second series of elongated slots 50 are disposed in overlapping relationship to the slots 49. Both the slots 49 and 50 are disposed in generally parallel relationship and extend almost the entire length of the edge 40. A perforate plate or screen 51 is disposed within the cavity 44 and adjacent the edge 40 and covers the openings of the slots 49 and 50. In operation of the nozzle of FIGURE 2 the dimensions of the slots 49 and 50 are chosen in such a manner that the cross-sectional area is at least 75 percent of the cross-sectional area of the exit opening 47 of the conduit 43. The cross-sectional area of the slots such as the slots 49 and 50 may be 10 to 20 times or more the cross-sectional area of the opening 47 but if less than about 75 percent no drip characteristics are not obtained. Beneficially, a screen or perforate sheet such as screen 51 is employed with particulate viscous systems in order to provide a back pressure and to assure that each slot or opening will start to discharge at about the same time when liquid is forwarded through the conduit 43 to the cavity 44.

In FIGURE 5 there is illustrated an alternate embodiment of the invention designated as 40a wherein a plurality of circular openings 49a and 50a are employed rather than the slots as depicted in FIGURES 2 and 3. 40a may be substituted for the edge 40 of FIGURE 2.

FIGURE 6 schematically depicts an alternate embodiment of the invention generally designated by the reference numeral 60. The nozzle or dispensing device 60 comprises a housing 61 having a first inlet conduit 62, a second inlet conduit 63 communicating with an internal cavity 65. The inlet 62 and 63 are disposed remote from a discharge edge or face 66 having defined therein a plurality of slot-like openings.

FIGURE 7 depicts a fractional view of an edge portion generally designated by the reference numeral 40b having defined therein a slot 49b. The slot 49b has curving end portions 70 and 71 and a generally elongate configuration.

In FIGURE 8 is a side 40c having defined therein a slot 49c having straight end portions 73 and 74 of semi-cylindrical configuration.

In the use of the apparatus of the present invention the particulate filler materials which are employed are generally of relatively small size, that is, those which pass a 350 mesh screen, U.S. Sieve Size or smaller. Therefore, a screen of from about 200 to about 40 mesh, U.S. Sieve Size disposed within a dispensing device functions as a means to provide a pressure drop and assure uniform starting and uniform stopping when filled liquid material is intermittently discharged by a positive displacement pump to a dispensing device. It is essential and critical in the practice of the present invention that the dispensing device have circular openings no larger than ⅜ of an inch if a plurality of circular streams are to be deposited. Dripping of the resinous material occurs if the dimension is greater than ⅜ of an inch. Generally it is preferred both from an ease of handling, uniformity of application, and ease of manufacturing to utilize elongate discharge ports or openings. Such discharge openings are eminently satisfactory if the width of such openings ⅛ of an inch or less. Slot-like discharge openings wider than about ⅛ inch give rise to undesired dripping when material has ceased to flow to the discharge nozzle. The length of the discharge openings, if a slot-like configuration is employed, is not critical, however, the width of the resin pattern laid down by the nozzle is somewhat dependent on the height of the discharge nozzle above the surface onto which the liquid is being dispensed. For example, a single slot having a width of ⅛ inch and a length of 6 feet is eminently suitable for coating or impregnating a preform or mat if the nozzle is positioned not more than about 1 to 2 inches above the mat being coated. However, if the distance through which the discharge stream falls increases it becomes desirable to employ a plurality of short overlapping slots such as slots about ⅛ inch in width and 1 to 2 inches in length, staggered in the manner of FIGURE 3. Thus, during the fall of the stream from the nozzle the effect of surface tension on the distribution of the material is considerably lessened and the contraction of the stream is uniform rather than erratically discontinuous as when a nozzle with a single long discharge slit is employed. When employing materials of exceptionally high viscosity in large nozzles it is frequently beneficial to employ a nozzle having two or more inlet passageways such as is illustrated in FIGURE 6. The configuration of the slot-like openings is not critical as to their general form as the rectangular openings of FIGURE 2, the curved end openings of FIGURE 8 or the elongate slot having arcuate end portions of FIGURE 7 operate equally well. From a pont of view of manufacture of discharge devices in accordance with the invention usually the embodiment of FIGURE 7 is found to be most convenient as elongate slots of this nature are readily cut with slitting saws and narrow milling cutters on horizontal milling machines.

Automated molding equipment suitable for use in association with the hereinbefore described nozzle is described in copending application Ser. No. 451,811, filed Apr. 29, 1965 by William K. Glesner.

A resin mixture is prepared by mixing 55 parts by weight of a commercial alkyd resin sold under the name MFG3482M, 36 parts by weight orthochlorostyrene, 9 parts by weight of styrene and 1 part by weight of a mold release agent commercially available under the trade name Zelec mold release agent and 1 part by weight of benzoyl peroxide. 55 parts by weight of the foregoing mixture are admixed with 45 parts by weight of clay. The resultant mixture had a viscosity of 30,000 centipoises. A nozzle generally in accordance with that shown in FIGURE 2 is prepared wherein the edge 40 has a configuration similar to that of FIGURE 5 wherein a plurality of holes were drilled. A positive displacement piston pump was connected to a source of resin and adapted to intermittently deliver a volume of 10 cubic inches of the resin mixture to the nozzle. No dripping was observed when holes of 0.045 inch, 0.109 inch, 0.187 inch, 0.250 inch and 0.375 inch were employed. When the holes were enlarged to 0.500 inch dripping occured. In all cases the area of the holes was greater than 75% of the inlet conduit. Similar results are noted when resin-clay filled systems are employed which have a viscosity from about 4000 to about 100,000 centipoises.

A generally similar experiment is conducted wherein a series of slits positioned generally in accordance with FIGURE 2 and having a configuration shown in FIGURE 7 were utliized. A plurality of end plates are prepared wherein the slit widths are 0.0625, 0.125, 0.1875 and 0.250 inch. Dispensing devices with the slits are evaluated using resins of widely varying viscosities from about 4000 to about 100,000 centipoise. No dripping is observed with the smaller slit widths. Slits are varied in length from 1 to 20 inches and with the narrow slits no dripping is observed.

A nozzle is prepared having an inlet conduit having a cross-section of 0.75 square inch. The dispensing portion of the nozzle has 19 slots formed therein, each slot is 0.75 inch in length and 0.032 inch in width to give a total area of 0.46 square inch. Eighty cubic inches of resin is dispensed from the nozzle. The resin has a viscosity of about 30,000 centipoises and is a polyesterorthochlorostyrene composition. Upon completion of the shot the nozzle drips and is slow to complete dispensing the desired quantity of resin. The nozzle is then modified by widening nine of the slots to a width of 0.062 inch to provide a total discharge area of 0.64 inch. On dispensing the shot, dripping is negligible. Employing a 17-inch wide nozzle with an inlet conduit having a cross-sectional area of 0.75 square inch, twenty-eight slots each measuring 0.75 inch in length and 0.017 inch in width are provided. These slots provide an outlet area of 0.375 square inch. On dispensing 80 cubic inches of the resin the nozzle drips for 15 seconds after distributing the resin on a substrate. The nozzle is modified by providing 30 slots each 0.75 inch in length and 0.032 inch in width to provide a total area of 0.72 square inch. Dripping stops in less than 5 seconds and is negligible. Utilizing the same resin at 80 cubic inches per dispensing shot, a nozzle 42 inches wide having two inlet conduits each 0.75 square inch inside cross-sectional area and an outlet having 69 slots measuring 0.75 inch by 0.046 inch is non-dripping. The slots have provided a total area of three square inches.

In a manner similar to the foregoing illustrations other viscous hardenable materials are readily dispensed without dripping of the nozzle. Such hardenable materials include vinyl plastisols, polyester molding compositions, filled liquid phenolic resins and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A dispensing apparatus particularly suited and adapted for the dispensing of the viscous liquids containing particulate filler materials, the liquid material having a viscosity of from about 4000 to about 100,000 centipoises, the apparatus comprising in cooperative combination means to dispense a predetermined quantity of the viscous liquid material, the dispensing means being in operative communication with a nozzle, the nozzle comprising a housing, the housing having a generally elongate configuration and a first edge and a second edge, the first edge and second edge being generally opposed, the housing defining an internal cavity, an inlet passageway having a cross-sectional area A in a plane normal to the direction of flow, the inlet passageway being disposed on the first edge of the housing, the second or lower edge of the housing denfiing a plurality of discharge openings in generally parallel relationship, the discharge openings having a total cross-sectional area at least 75 percent of A.

2. The nozzle of claim 1 wherein the discharge openings are a plurality of slots.

3. The nozzle of claim 2 wherein the slots have a width up to about ⅛ of an inch.

4. The nozzle of claim 3 wherein the slots are disposed in overlapping relationship.

5. The apparatus of claim 1 in cooperative combination with means to position an article to be coated with the viscous material and pass it adjacent the second edge of the nozzle.

6. The apparatus of claim 5 in cooperative combination with a molding press adapted to receive and mold the impregnated article.

7. A dispensing apparatus particularly suited and adapted for the dispensing of the viscous liquids containing particulate filler materials, the liquid material having a viscosity of from about 4000 to about 100,000 centipoises, the apparatus comprising in cooperative combination means to dispense a predetermined quantity of the viscous liquid material, the dispensing means being in operative communication with a nozzle, the nozzle comprising a housing, the housing having a generally elongate configuration and a first edge and a second edge, the first edge and second edge being generally opposed, the housing defining an internal cavity, an inlet passageway having a cross-sectional area A in a plane normal to the direction of flow, the inlet passageway being disposed on the first edge of the housing, the second or lower edge of the housing defining a plurality of discharge openings having a circular configuration and a diameter not over ⅜ inch, the openings being in generally parallel relationship, the discharge openings having a total cross-sectional area at least 75 percent of A.

References Cited

UNITED STATES PATENTS

| 2,573,144 | 10/1951 | Jaye | 239—566 |
| 2,726,632 | 12/1955 | Asbeck et al. | 239—566 |
| 3,312,999 | 4/1967 | Greten et al. | 18—4 |

WILBUR L. McBAY, *Primary Examiner.*

U.S. Cl. X.R.

222—478